United States Patent [19]

Asquith

[11] 4,134,477
[45] Jan. 16, 1979

[54] SLIDING CALIPER DISC BRAKES
[75] Inventor: Anthony Asquith, Nuneaton, England
[73] Assignee: Girling Limited, Birmingham, England
[21] Appl. No.: 781,476
[22] Filed: Mar. 25, 1977
[30] Foreign Application Priority Data
Mar. 26, 1976 [GB] United Kingdom ............... 12258/76
[51] Int. Cl.² ............................................. F16D 55/224
[52] U.S. Cl. .................................. 188/73.3; 188/73.5; 188/73.6
[58] Field of Search ................... 188/73.3, 73.5, 72.4, 188/72.5, 73.4, 73.6

[56] References Cited

U.S. PATENT DOCUMENTS

| | | | |
|---|---|---|---|
| 3,592,301 | 7/1971 | Auth ..................................... | 188/73.6 |
| 3,612,226 | 10/1971 | Pauwels .............................. | 188/73.3 |
| 3,782,509 | 1/1974 | Cook et al. ......................... | 188/73.3 |
| 3,893,546 | 7/1975 | Kestermeier et al. ............. | 188/73.3 |

FOREIGN PATENT DOCUMENTS

| | | | |
|---|---|---|---|
| 2363400 | 7/1975 | Fed. Rep. of Germany .......... | 188/73.3 |
| 2538565 | 3/1976 | Fed. Rep. of Germany .......... | 188/73.3 |
| 2257819 | 7/1975 | France .................................... | 188/73.3 |

*Primary Examiner*—George E. A. Halvosa
*Attorney, Agent, or Firm*—Scrivener, Parker, Scrivener & Clarke

[57] ABSTRACT

A sliding caliper disc brake comprising a torque member which is adapted to be fixedly mounted adjacent a brake disc and which has portions lying on both sides of the brake disc which are connected by bridging portions positioned radially outwardly of the periphery of the disc. Directly and indirectly operated friction pad assemblies are located on opposite sides of the disc and each include a friction pad carried by a respective pad backing plate. A caliper member is mounted on the torque member. The caliper member is guided for sliding movement relative to the torque member in a direction perpendicular to the disc, the caliper member and both the friction pad assemblies being supported by the torque member so that drag forces experienced by the pads during use of the brake are transmitted directly to the torque member. The guiding means for the caliper member comprises at least one springy guide which is located against radially outward displacement relative to the torque member by a springy tag portion which engages the under surface of one of the bridging portions of the torque member.

7 Claims, 6 Drawing Figures

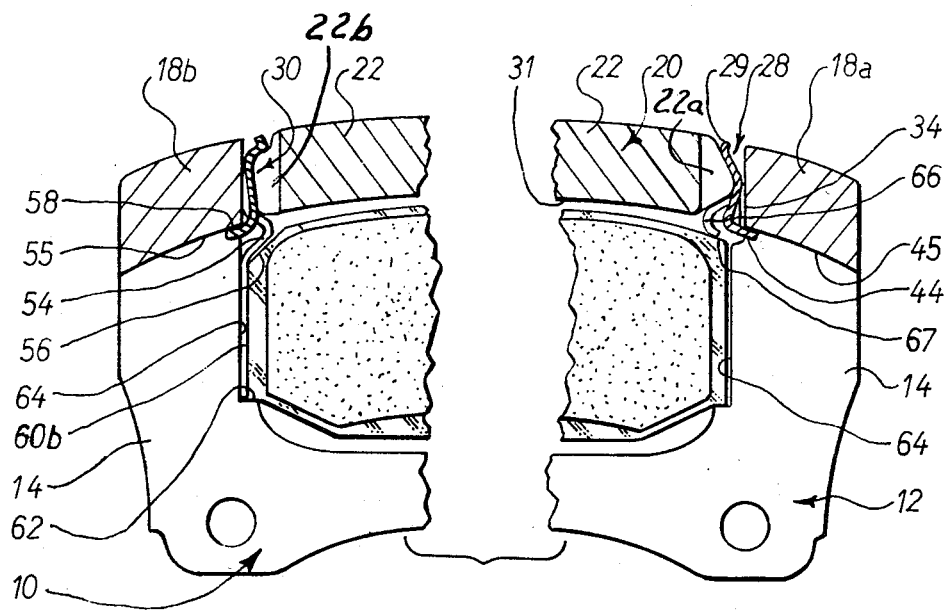
FIG.1.
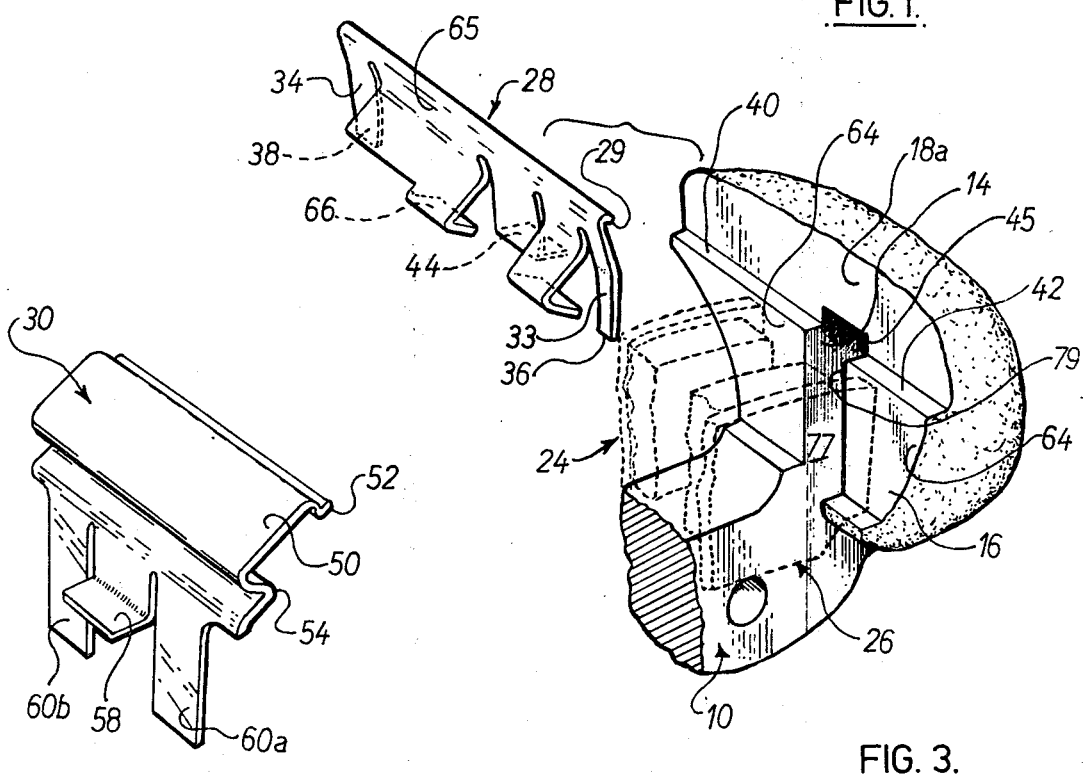
FIG.2.
FIG.3.

SLIDING CALIPER DISC BRAKES

The present invention relates to sliding caliper disc brakes and is particularly concerned with sliding caliper disc brakes of the type which include a fixed torque member which has portions lying on both sides of the brake disc which are connected by a bridging portion positioned radially outwardly of the periphery of the disc.

In brakes of this type, the sliding caliper part of the brake and both of the brake pads are supported by the torque member so that the drag forces experienced by the pads are transmitted directly to the torque member. As a result, the caliper is not subject to drag forces. This arrangement has the advantage that the guides that locate the caliper for sliding relative to the fixed torque member need only be sufficiently robust to support the caliper against vibration forces. Clearly, these guides must prevent movement of the caliper in all directions except axial sliding. Equally, however, the guides must be readily releasable for servicing, but adequately held so that under no circumstances can the caliper become detached in operation. Furthermore, the guides must not tend to seize or corrode during operation.

These guide requirements have resulted hitherto in that, although only a flimsy guide is strictly necessary to support the loads met in actual operation, the guides have still been relatively sophisticated to fulfil the other requirements mentioned.

One approach to the corrosion problem has been to provide fully booted pins on which the caliper slides. With that construction, however, apart from the expense involved, difficulty can arise due to the relative deflection of the torque member with respect to the caliper which can occur during operation of the brake and which can cause jamming of the pins. Another method of avoiding seizure due to corrosion in exposed slides it to ensure that the guide touches its associated caliper surface only over a very small area, such that any corrosion that does form is soon broken away upon the slightest movement.

It is also known for the caliper to be slidably mounted relative to the torque member on a single guide pin, means being provided for preventing rotation of the caliper about that single pin.

Further requirements are that the caliper, in addition to the pads, should not rattle and, of course, the brake should be cheap to produce and easy to manufacture and assemble.

In accordance with the present invention, there is provided a sliding caliper disc brake comprising a torque member which is adapted to be fixedly mounted adjacent a brake disc and which has portions lying on both sides of the brake disc which are connected by bridging portions positioned radially outwardly of the periphery of the disc, directly and indirectly operated friction pad assemblies located on opposite sides of the disc and each including a friction pad carried by a respective pad backing plate, a caliper member mounted on the torque member, and means guiding the caliper member for sliding movement relative to the torque member in a direction perpendicular to the disc, the caliper member and both the friction pad assemblies being supported by the torque member so that drag forces experienced by the pads during use of the brake are transmitted directly to the torque member, said guiding means for the caliper member comprising at least one springy guide which is located against radially outward displacement relative to the torque member by a springy tag portion which engages the under surface of one of said bridging portions of the torque member.

Conveniently, the or each springy guide is located axially by the axial fit of its tag portion in the disc clearance gap provided in the torque member.

The invention is described further hereinafter, by way of example, with reference to the accompanying drawings, in which:

FIG. 1 is a section through a brake assembly in accordance with the invention showing two embodiments of springy guide;

FIG. 2 is a perspective view of the left hand guide of FIG. 1;

FIG. 3 is a partial, exploded view of the brake assembly of FIG. 1 showing the right hand guide;

Figure 4:
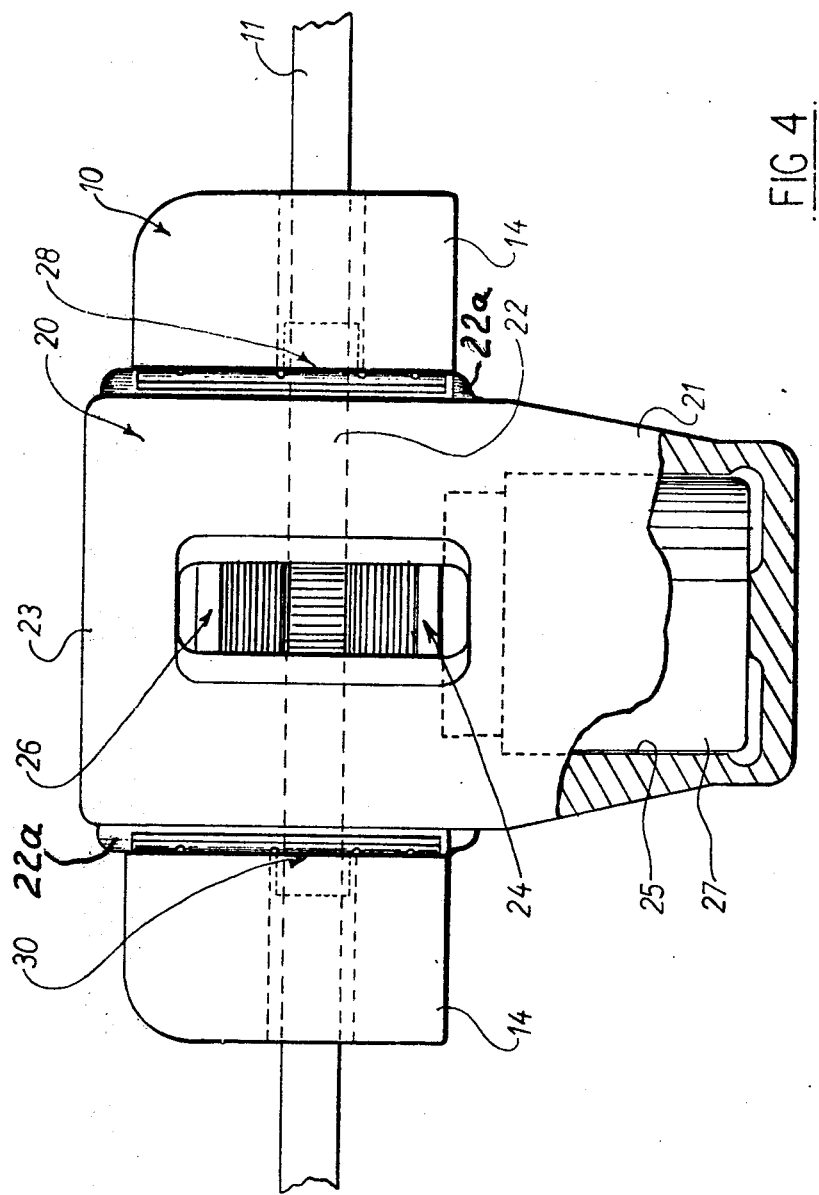
FIG. 4 is a partially cut-away plan view of the brake assembly of FIG. 1.

The brake assembly illustrated in FIGS. 1, 3 and 4 includes a torque member 10 having a main, radially directed portion 12 lying on one side of a brake disc 11 (FIG. 4), the main portion 12 being bifurcated to present a pair of lateral arms 14 situated at respective circumferential end regions of the torque member and each passing over the brake disc 11 to terminate at the opposite side thereof in a respective radially inwardly directed end portion 16. The radially extending portions 14 and 16 on the two sides of the disc are interconnected by bridging portions 18a, 18b located radially outwardly of the disc. A generally U-shaped caliper member 20 has a radially inwardly directed rear limb 21 (FIG. 4) connected by an axially extending bridge portion 22 to a radially inwardly directed front limb 23. The bridge portion 22 of the caliper member passes between the opening defined between the arms 14 of the torque member and includes at its opposite ends rails 22a or 22b. The rear caliper limb 21 carries at least one hydraulic cylinder 25 serving as an actuator for the brake (see FIG. 4), the cylinder 25 carrying a piston 27 which is displaceable in response to fluid pressure within the cylinder in order to directly displace a first friction pad assembly 24 into engagement with the brake disc 11. By virtue of the reaction resulting from engagement of the first friction pad assembly 24 with the brake disc 11, the caliper member 20 is caused to slide relative to the torque member 10 to thereby cause a second friction pad assembly 26 (the indirectly operated pad assembly) to engage the opposite face of the brake disc 11.

It is thus a requirement of the aforegoing assembly that the caliper member 20 be capable of performing axial sliding movement relative to the torque member 10 but must be constrained against movement in other directions, i.e., radial and circumferential movement and tipping or rocking movements relative to the torque member and brake disc, and it is with the guide means by which the caliper member is constrained relative to the torque member that the present invention is particularly concerned.

Two examples of such guide means are illustrated in FIG. 1 wherein the right hand side of the caliper 20 is constrained by a guide member 28 and the left hand side by a guide member 30, although it will be understood of course that in practice either a pair of guide members 28 or a pair of guide members 30 would normally be used. The left hand guide 30 is shown in more detail in FIG. 2 and the right hand guide in more detail in FIG. 3.

With reference to the right hand side of FIG. 1 and to FIG. 3, the guide 28 comprises an elongate spring member whose main body portion 65 has a principal sectional contour which is curved to conform to that of the lateral, generally convex sliding surface of the rails 22a of the caliper 20 whereby the spring member locates itself radially with respect to the caliper as shown in FIG. 1. The radially outer edge of the spring member has a bent-over lip or flange 29 which serves principally to impart axial stiffness to the spring member.

First, radially extending tag portions 33, 34 at the axial ends of the spring member define surfaces 36, 38 adapted to respectively engage surfaces 40, 42 on the arms 14 and 16 of the torque member 10 for locating the spring member radially inwardly relative to the torque member. The spring member further includes a laterally extending tag portion 44 adapted to engage within the clearance gap provided in the torque member for accommodating the brake disc, (i.e., the tag portion engages the radially inner surface 45 of the bridging portion 18a of the torque member which straddles the disc) whereby to locate the spring member, and hence the caliper, in a direction radially outwardly relative to the torque member. Normally, the tag portion 44 would be arranged to engage the clearance gap with only a small or negligible axial play whereby to restrict or inhibit axial movement of the spring member 28 relative to the torque member 10.

Immediately beneath the main body portion 65, the guide 28 includes projecting portions 66 adapted to overlie upper corner portions 67 of the pad support plates whereby to assist in locating the pad support plates against radially outward displacement. The portions 66 of the guide need not actually engage the corner portions 67 of the pad support plates at all times although in some embodiments a resilient engagement could be provided between these members to bias the pad support plates radially inwardly.

It will be appreciated that the main difficulty in using a spring member to locate the caliper lies in providing radially outwards location of the spring member relative to the torque member, and at the same time allowing the arrangement to be conveniently assembled whilst being sufficiently secure to prevent accidental removal. As illustrated in FIG. 1, the presently described embodiment is assembled simply by hooking two of the spring members around the sliding end surfaces or rails 22a of the caliper, and then pressing all three members into the torque member until the tag portions 44 on the spring members engage under the bridge portions 18a, 18b, respectively. Thereafter, the spring members, and hence the caliper, remain firmly secured until a tool is inserted into the gap between the periphery of the disc and the underside of the torque member bridge portions to push each tag portion 44 inwards to release same from engagement with said bridge portions.

Thus, the present arrangement utilises the under-surface of the torque member bridge portion as a location from which to prevent radially outward displacement of the caliper. It will be noted that this surface is of course already provided on brake assemblies of the type under discussion so that no extra machining is required in this respect.

With reference now to the left hand side of FIG. 1 and to FIG. 2, the guide 30 is in the form of a spring member which comprises a main body portion 50 having a principal sectional contour which is shaped to conform to that of the lateral, generally convex surface of the rail 22b of the caliper 20 whereby the spring member locates itself radially with respect to the caliper as shown in FIG. 1. The radially outer edge of the main portion 50 of the spring has a bent-over lip or flange 52 to impart axial stiffness to the guide.

Immediately beneath the main body portion 50, the guide includes a projecting portion 54 adapted to overlie bevelled shoulder portions 56 of the pad support plates whereby to assist in locating the pad support plates against radially outward displacement. As shown in FIG. 1, the portion 54 of the guide need not actually engage the bevelled portions of the pad support plates although in other embodiments a resilient engagement could be provided between these members to bias the pad support plates radially inwardly.

The guide 30 further includes a laterally projecting tag portion 58 adapted to engage within the clearance gap provided in the torque member for accommodating the brake disc, (i.e., the tag portion engages the radially inner surface 55 of the portion of the torque member which straddles the disc) whereby to locate the guide 30, and hence the caliper, radially outwardly relative to the torque member.

Finally, the guide 30 includes radially inwardly projecting leg portions 60a, 60b adapted to engage surfaces 62 on the torque member for radially locating the guide 30. It will be noted from FIG. 1 that the leg portions 60a, 60b lie between the side surfaces of the pad support plates and the adjacent radially extending walls 64 of the torque member. These leg portions can be useful firstly as pad anti-rattle means since they can be designed to bias the two sides of the pad support plates away from said adjacent radially extending torque member walls 64, and secondly to spread the drag load from the pad support plates onto said adjacent radially extending torque plate walls 64. The latter action can be useful if the torque member is made of a relatively soft material such as aluminum, for example.

In its use as a pad anti-rattle means, an advantage of the present guides is that nothing is interposed between the radially inner surface 31 of the caliper bridge portion 22 and the periphery of the disc. Since it is this inner surface of the caliper that is most highly stressed due to clamp loads, the surface should be as close to the disc as possible, not only to achieve maximum bridge thickness, but also to reduce the bending moment in the bridge. In the past, some pad anti-rattle springs have occupied space between the bridge and the disc.

The relative ease of manufacture of the present brake can be seen from FIGS. 1 and 3. The pad guide surfaces 42, 62 and 64 are simple flat surfaces, easily machinable by broaching.

To reduce machining requirements, the laterally extending guide surfaces or rails 22a and 22b on the caliper which are to contact the guides 28 or 30 can be relieved in their central region since it is the axially outermost portions of these surfaces which obviously play the greatest part in locating the caliper. Furthermore, relieving the central regions of the caliper lateral guide surfaces in this manner has the further benefit of providing room for the tag portions 44 or 58 of the guides to be displaced towards the caliper during assembly, i.e., before the tags engage under the bridge portions 18. This facilitates introduction of the guides 28 or 30 into their assembled positions.

The above described guides can thus be cheap, easy to form and assemble, prevent caliper rattle, cannot seize or jam, be easily releasable for service and yet be impossible to work loose merely by vibration. In addition they can obviate the need for separate anti-rattle provisions.

Figure 5:
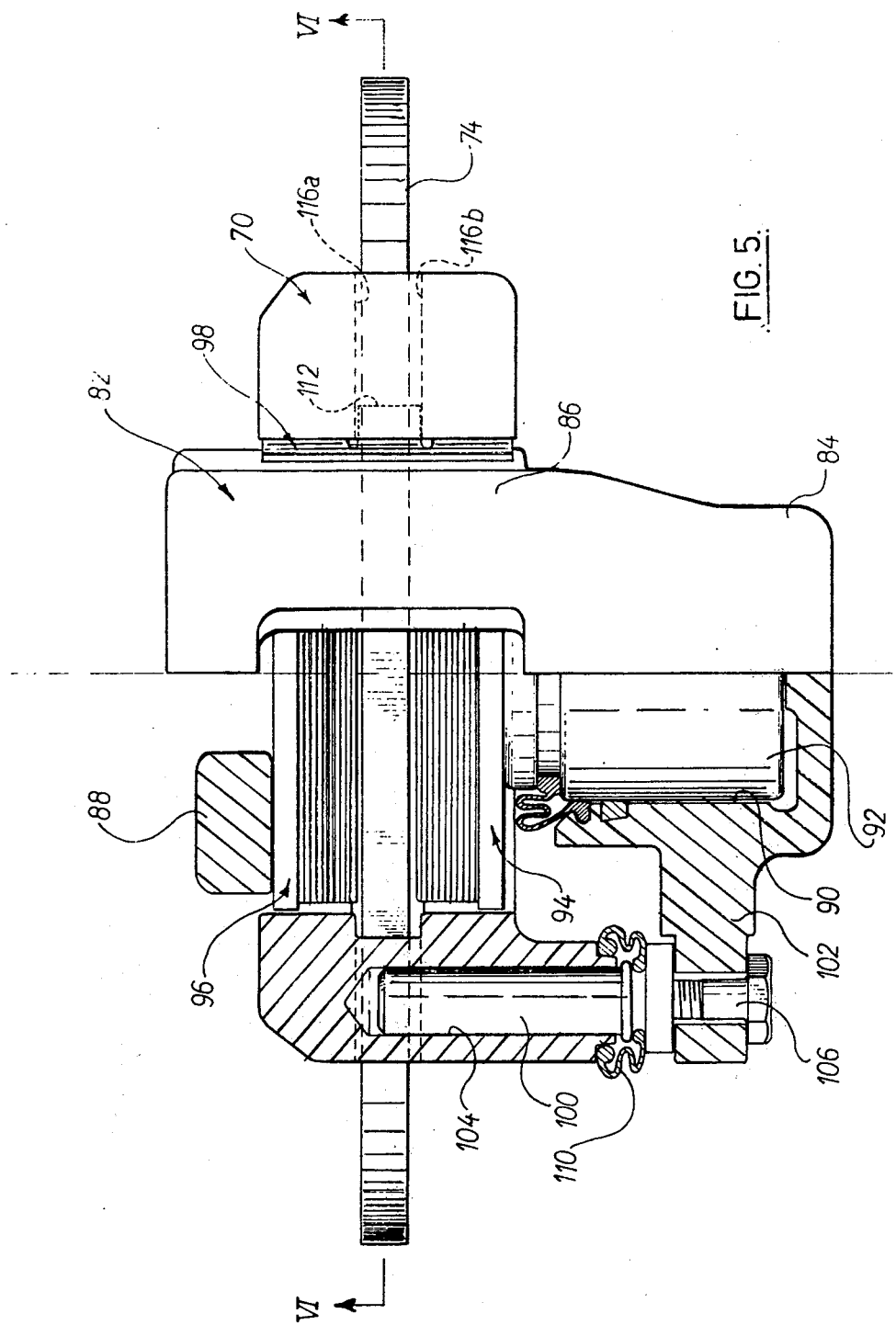
FIG. 5 is a partially sectioned plan view of a second brake assembly in accordance with the invention.
Figure 6:
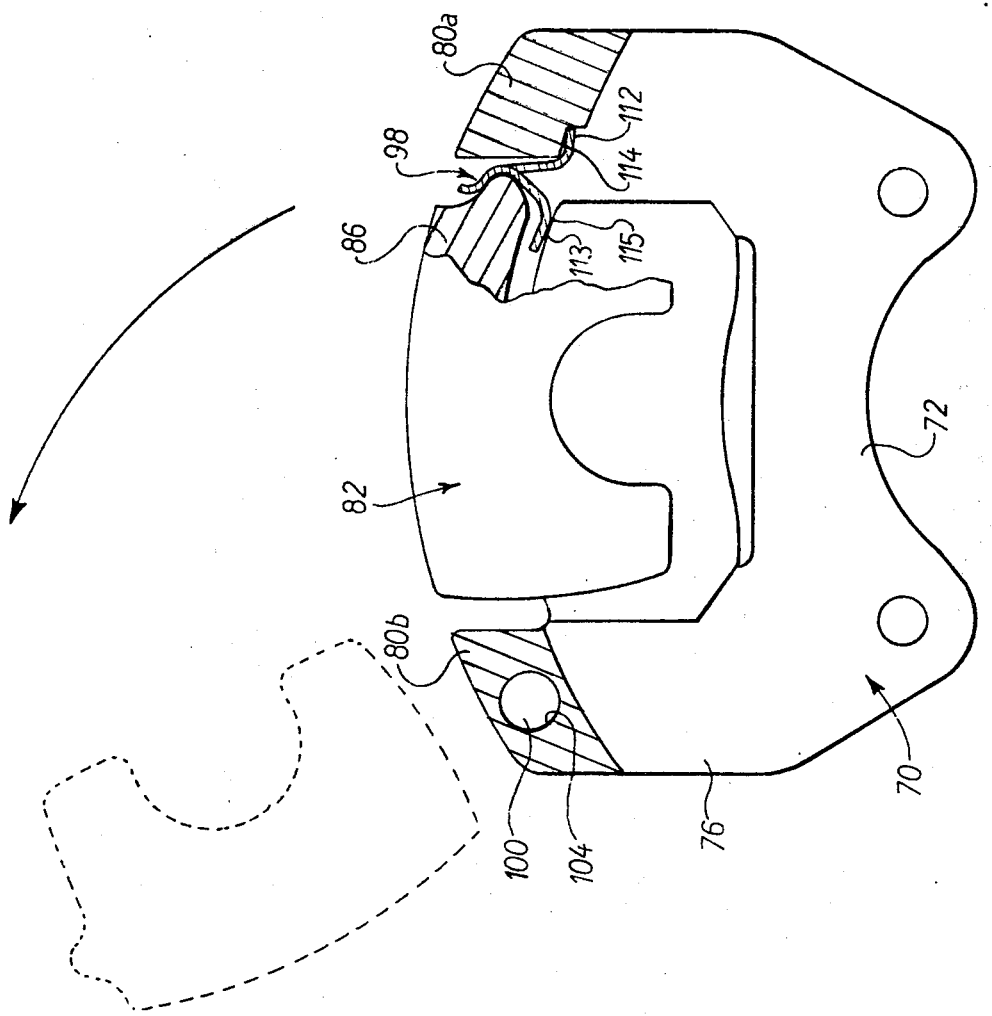
FIG. 6 is a diagrammatic partial section on the line VI—VI in FIG. 4.

The brake assembly of FIGS. 5 and 6 similarly includes a torque member 70 having a main, radially directed portion 72 lying on one side of the brake disc 74, the main portion 72 being bifurcated to present a pair of lateral arms 76 situated at respective circumferential end regions of the torque member and each passing over the brake disc 74 to terminate at the opposite side thereof in a respective radially inwardly directed end portion 78. The radially extending portions 76 and 78 on the two sides of the disc 74 are interconnected by bridging portions 80a, 80b located radially outwardly of the disc. A generally U-shaped caliper member 82 has a radially inwardly directed rear limb 84 connected by an axially extending bridge portion 86 to a radially inwardly directed front limb 88. The bridge portion 86 of the caliper member passes between the opening defined between the arms 76 of the torque member. The rear caliper limb defines a hydraulic cylinder 90 serving as an actuator for the brake, the cylinder carrying a piston 92 which is displaceable responsive to fluid pressure within the cylinder in order to directly displace a first friction pad assembly 94 into engagement with the brake disc 74. By virtue of the reaction resulting from engagement of the first friction pad assembly 94 with the brake disc 74, the caliper member 82 is caused to slide relative to the torque member 70 to thereby cause a second friction pad assembly 96 (the indirectly operated pad assembly) to engage the opposite face of the brake disc 74.

As in the assembly illustrated in FIGS. 1 to 4, the caliper member 82 has to be capable of performing axial sliding movement relative to the torque member 70 but must be constrained against movement in other directions, i.e., radial and circumferential movement and tipping or rocking movements relative to the torque member 70 and brake disc 74. For this purpose, the right hand side of the caliper 82 (as viewed in FIGS. 5 and 6) is guided on the torque plate 70 by a single guide member 98 of the type shown in FIG. 2 or FIG. 3, and the left hand side is guided by a single guide pin 100 which is rigidly fixed to a laterally extending lug 102 on the caliper rear limb 84 and which is slidably received in a bore 104 in the left hand portion of the torque member which lies radially outwardly of the brake disc 74. The pin 100 is clamped to the caliper lug 102 by a screw-threaded bolt 106, the sliding surfaces being protected against the ingress of foreign matter by a flexible boot 110.

FIGS. 5 and 6 clearly show how the tag portion 112 engages under the radially inner surface 114 of the portion 80a of the torque member which lies outwardly of the disc and between the opposing walls 116a, 116b of the torque plate which define the clearance gap for receiving the disc.

It will be appreciated that the arrangement of FIGS. 5 and 6 has the benefit that the caliper 82 may be adequately located against tipping and rocking by means of the sliding engagement of the pin 100 in the bore 104, without having to provide the guide member 98 with substantial axial length. Furthermore, the pin 100 can be made to be more robust than the guide member 82. A further benefit is that, as illustrated diagrammatically in FIG. 6, when the guide member 82 is removed, the caliper can be pivoted about the pin 100 to the position shown by a dashed line to thereby facilitate pad replacement.

I claim:

1. A sliding caliper disc brake comprising: a torque member adapted to be fixedly mounted adjacent a brake disc; a caliper member guided for axial sliding relative to said torque member; a pair of pads, one on each side of the disc; said caliper member being U-shaped and having a bridge portion which straddles the periphery of said disc; said bridge portion having two circumferentially spaced end surfaces at least one of which defines a rail; said torque member having two bridge portions which straddle the disc, and which are disposed at circumferentially spaced locations, one on either side of said bridge portion of said caliper member; each bridge portion of the torque member having an inner end face facing an adjacent one of said end surfaces of the caliper member, and having an under-surface facing the outer periphery of said disc; a springy guide member interposed between said at least one end surface of the bridge portion of the caliper which defines said rail and the inner end face of the adjacent bridge portion of the torque member; said springy guide member being so shaped as to engage the said rail to prevent radially outward movement of the rail relative to said springy guide member; said end face and said end surface being spaced apart to enable said springy guide member and said end surface of said caliper to move radially outwardly together relative to said torque member; and a tag on said springy guide member which is permanently resiliently biassed away from said end surface and towards said end face; said tag engaging the undersurface of the said bridge portion of the torque member so as to prevent radially outward movement of said springy guide member relative to the torque member; said tag being movable against said resilient bias towards the said end surface and away from said end face to a position where the tag is clear of the said undersurface, to allow the springy guide member and the said end surface to move radially outwardly together relative to the torque member, and wherein said springy guide member further includes radially inwardly extending, second, tag portions located at the axial ends of the springy guide member for respectively engaging surfaces on said portions of the torque member lying on the two sides of the disc, to thereby locate the springy guide member radially inwardly relative to the torque member.

2. A disc brake according to claim 1, in which said second tag portions extend between side surfaces of the pad backing plates and adjacent radially extending walls of the torque member, whereby to serve as pad anti-rattle means and to spread drag loads from the pad assemblies onto said radially extending walls of the torque member.

3. A sliding caliper disc brake according to claim 1, in which said rail comprises a generally convex shape formed on said end surface of the bridge portion of the caliper member; and in which the springy guide member is formed from substantially constant thickness material, and has a main body portion curved to conform to the said rail so as to locate the springy guide member radially relative to the said rail.

4. A disc brake according to claim 3, in which said first mentioned tag extends laterally of the springy guide member for engaging said under surface of the associated torque member bridging portion, axial location of the springy guide member relative to the torque member being achieved by said tag being received between opposed radially extending surfaces of said portions of the torque member lying on the two sides of the disc.

5. A disc brake as claimed in claim 3, in which the springy guide member includes projecting portions adapted to overlie upper corner portions of the pad backing plates whereby to assist in locating the latter plates against radially outward displacement relative to the torque member.

6. A sliding caliper disc brake according to claim 1, wherein the said two circumferentially spaced end surfaces of the bridge portion of the caliper member both define rails; a further similar springy guide member being interposed between the other of said end surfaces and the corresponding end face of the other bridge portion of said torque member.

7. A sliding caliper disc brake according to claim 1, wherein the caliper member is guided for axial sliding upon the torque member by means of a single pin rigidly attached to one of the members and slidably received in a circular bore of the other member, about the axis of which the caliper may rotate in a plane parallel to the disc in the absence of said springy guide member, the caliper being prevented from rotating in the said manner by the said engagement of the springy guide member with the said rail, and by the said engagement of said tag against said under surface.

* * * * *